No. 735,368. PATENTED AUG. 4, 1903.
E. E. HANNA.
COTTON PRESS.
APPLICATION FILED OCT. 22, 1902.
NO MODEL. 7 SHEETS—SHEET 1.

No. 735,368. PATENTED AUG. 4, 1903.
E. E. HANNA.
COTTON PRESS.
APPLICATION FILED OCT. 22, 1902.
NO MODEL. 7 SHEETS—SHEET 4.

Witnesses:

Inventor:
Elmer E. Hanna,
By Thomas F. Sheridan,
Atty.

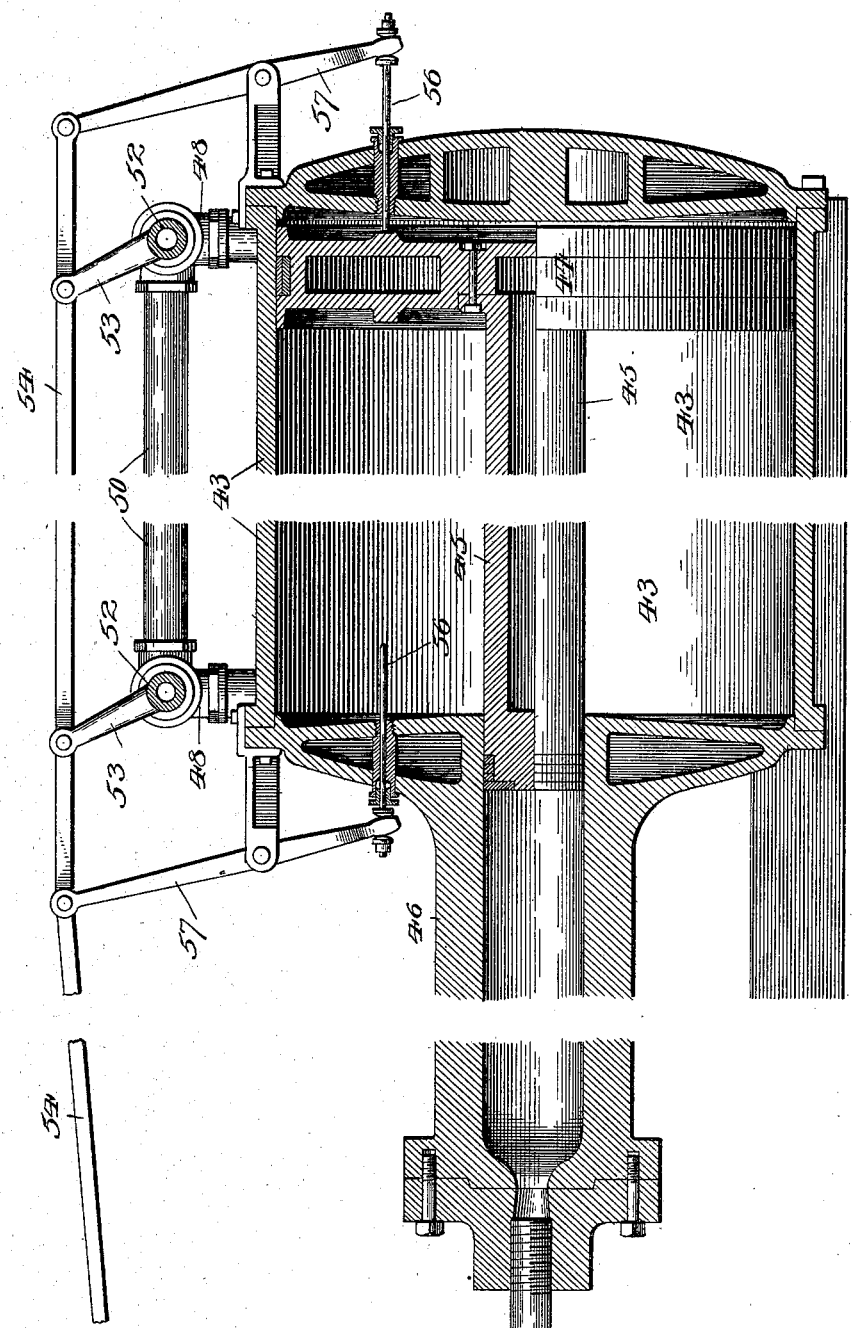

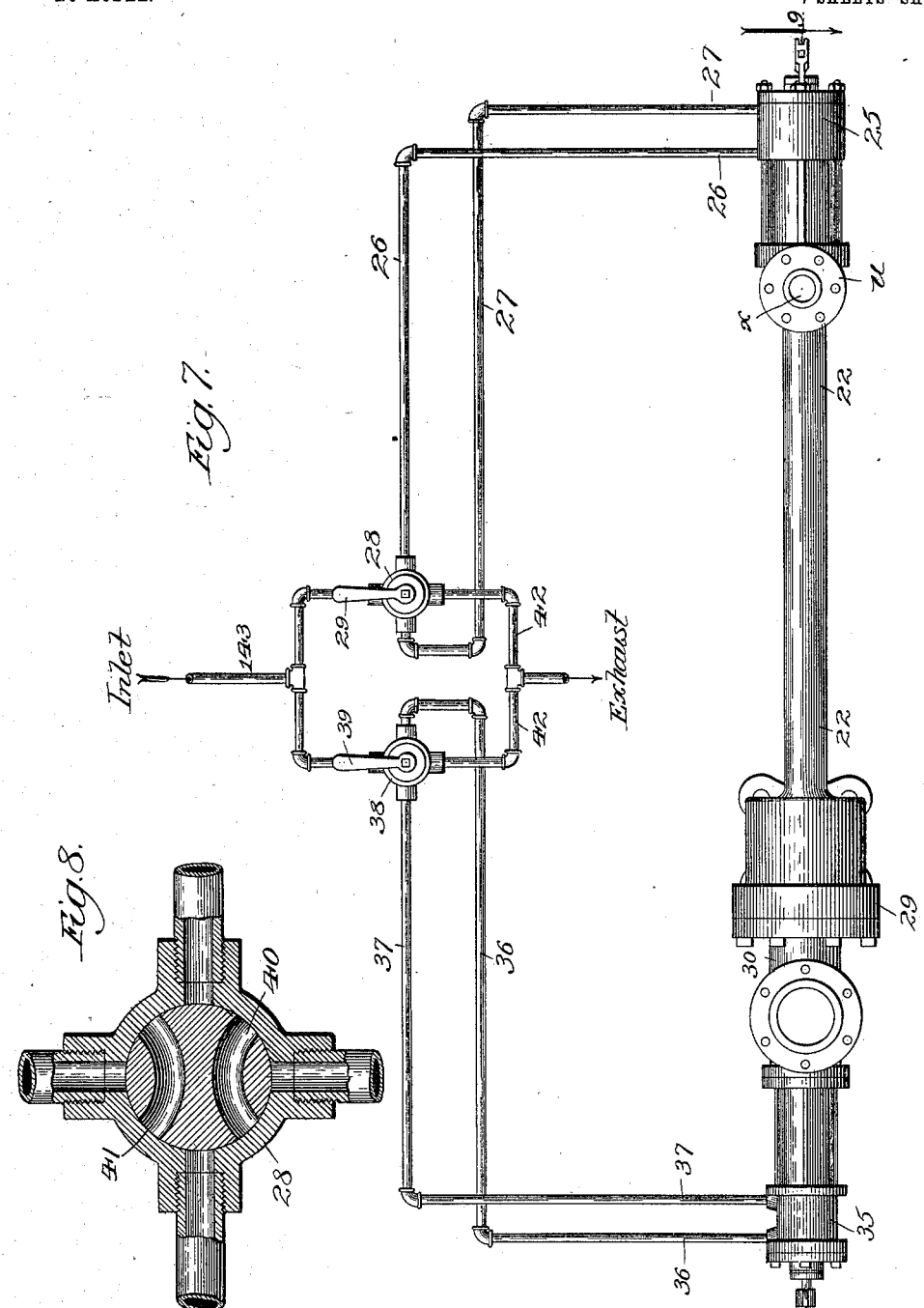

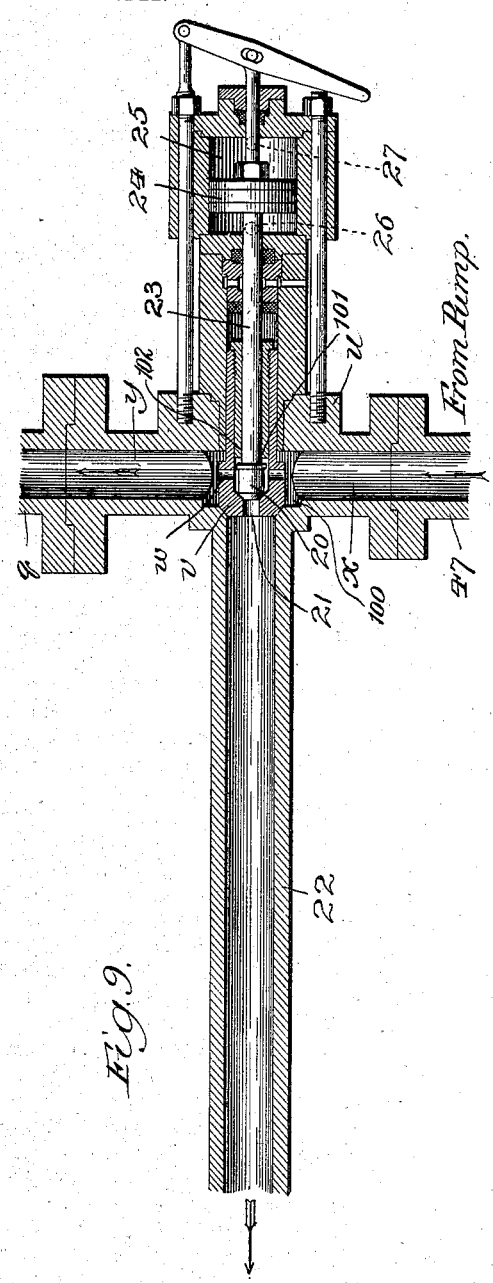
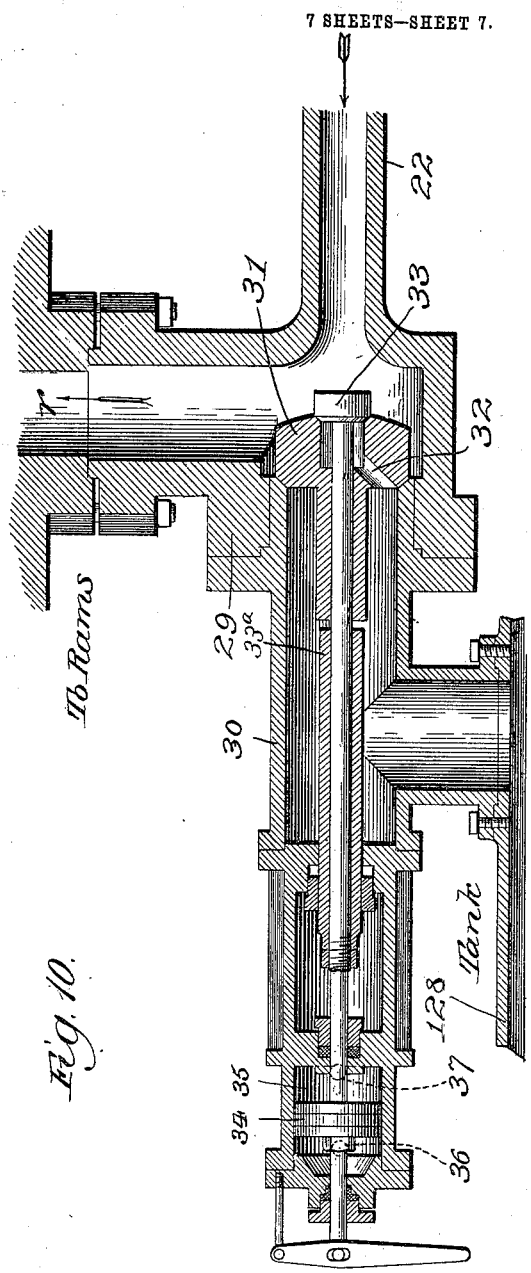

No. 735,368. Patented August 4, 1903.

UNITED STATES PATENT OFFICE.

ELMER E. HANNA, OF CHICAGO, ILLINOIS.

COTTON-PRESS.

SPECIFICATION forming part of Letters Patent No. 735,368, dated August 4, 1903.

Application filed October 22, 1902. Serial No. 128,303. (No model.)

*To all whom it may concern:*

Be it known that I, ELMER E. HANNA, a citizen of the United States, residing at Chicago, Illinois, have invented certain new and useful Improvements in Cotton-Presses, of which the following is a specification.

This invention relates to improvements in cotton-presses, and has for its object the provision of a press having a flexible platen arranged to compensate for inequalities of pressure and resistance, associated with piston mechanism for operating the same and instrumentalities for operating said mechanism, preferably fluid-pressure means, the piston mechanism being so related to the platen as to permit flexing of the latter.

Figure 1:
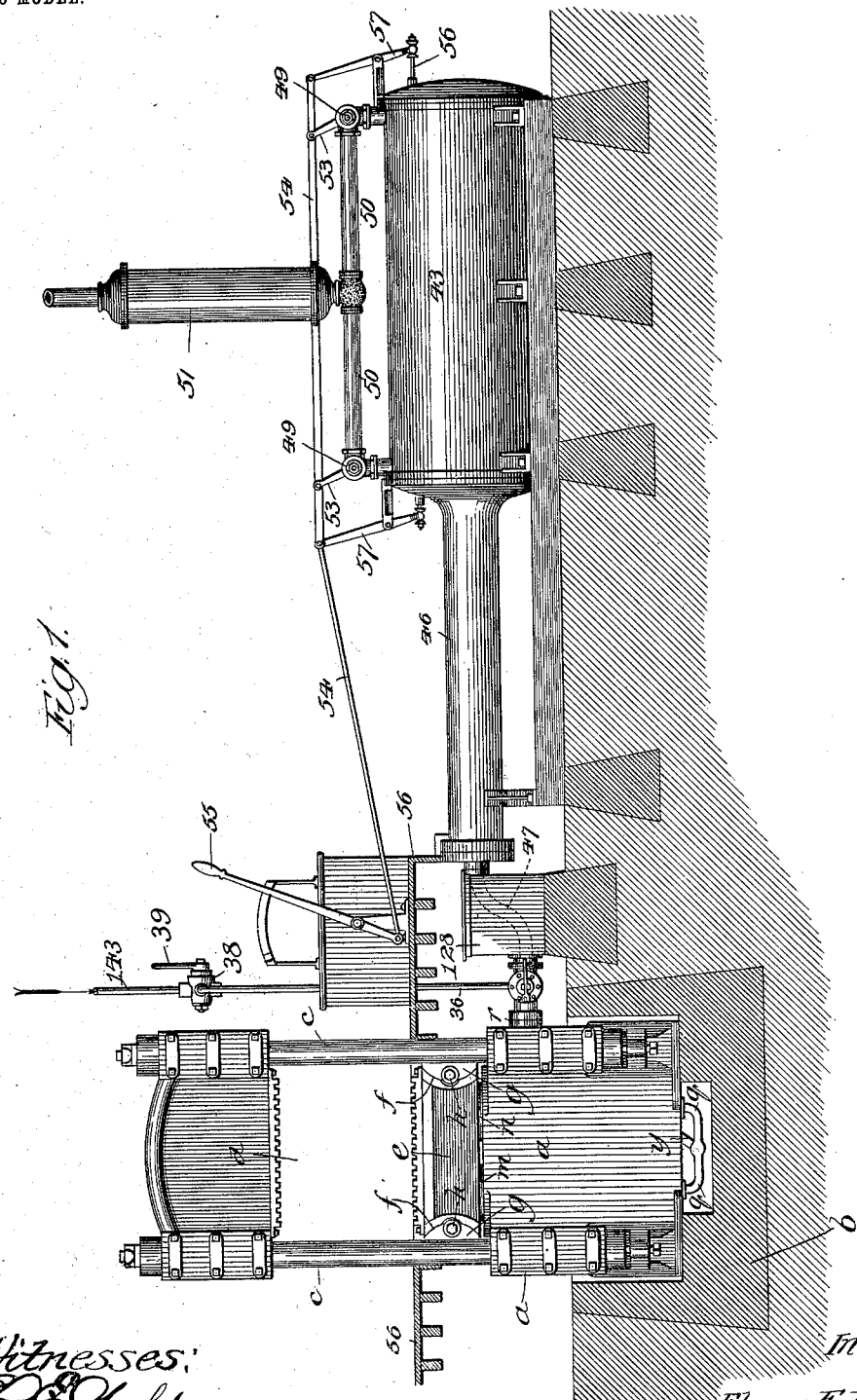
Figure 2:
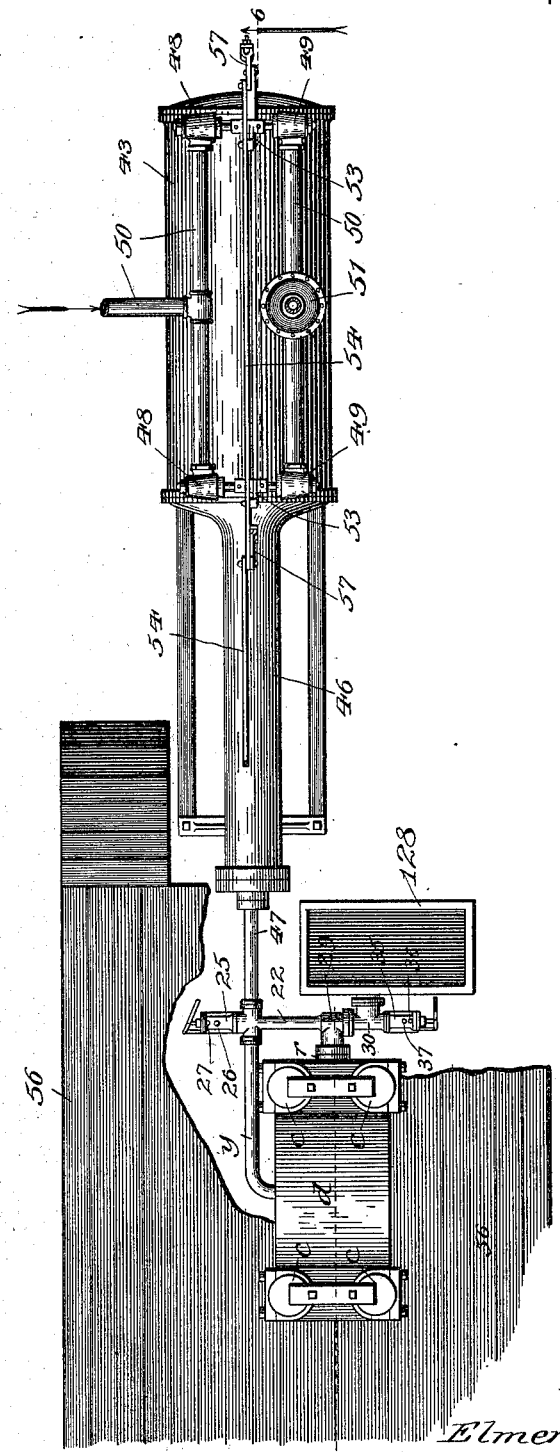
Figure 3:
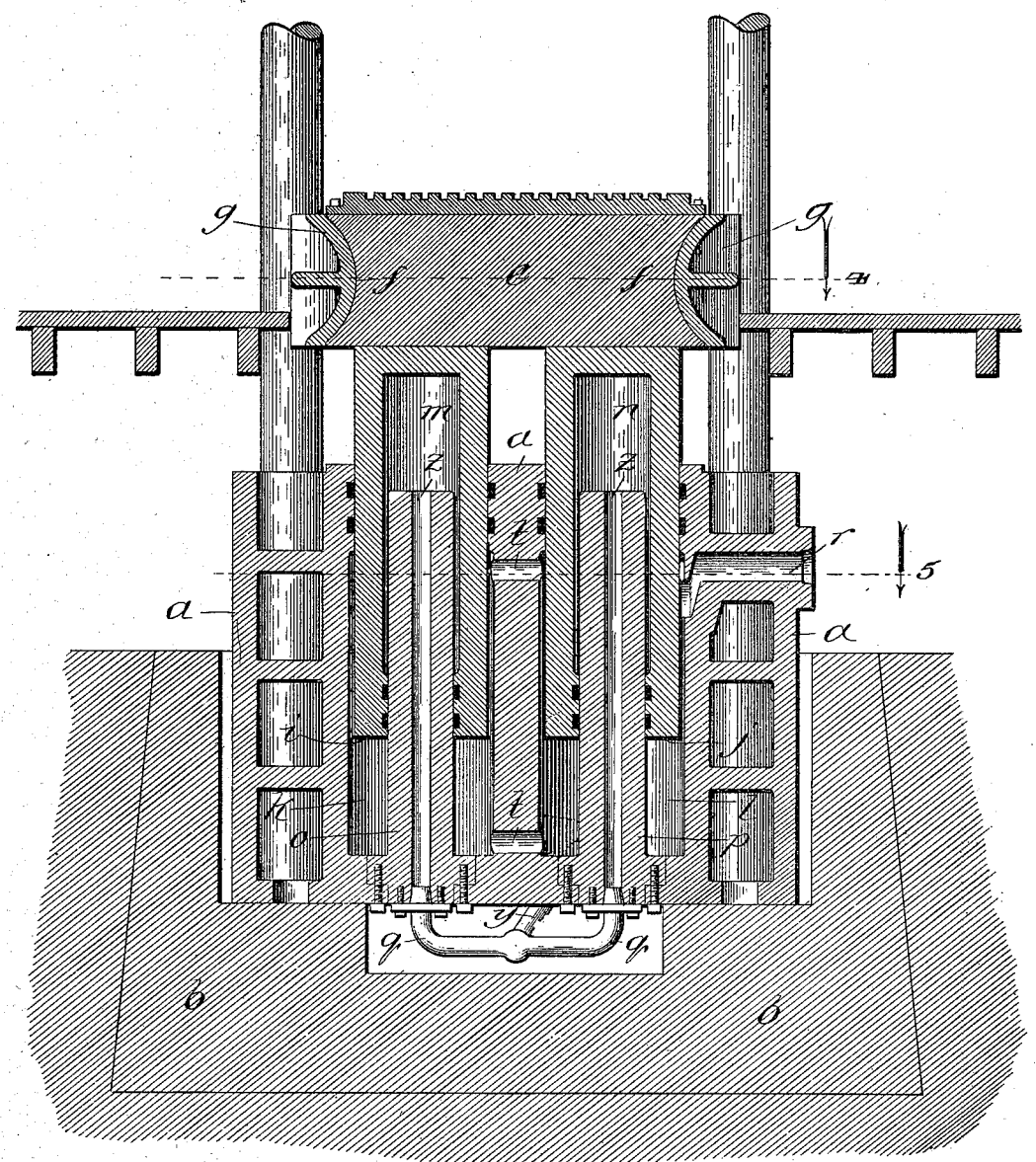
Figure 4:
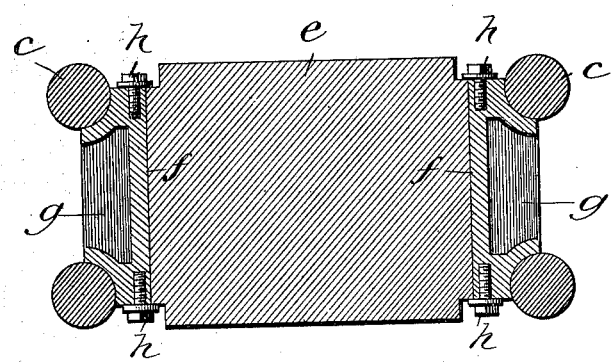
Figure 5:
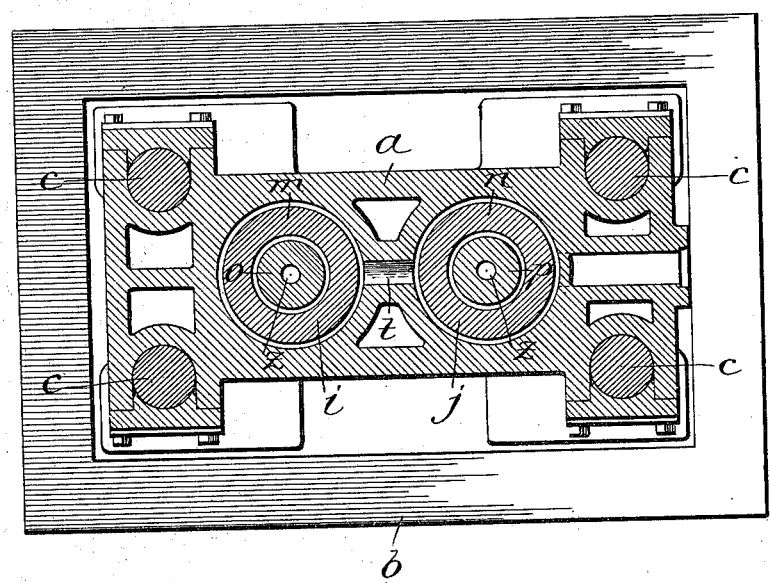

In the accompanying drawings, Figure 1 is a side elevation of a cotton-press constructed in accordance with these improvements; Fig. 2, a plan view of the same, showing a portion of the platform and other parts broken away; Fig. 3, an enlarged vertical sectional elevation of a portion of the cylinder and other mechanisms, taken on line 3 of Fig. 2 looking in the direction of the arrow; Fig. 4, a plan sectional detail of the movable platen, taken on line 4 of Fig. 3 looking in the direction of the arrow; Fig. 5, a plan sectional view of the cylinders and pistons, taken on line 5 of Fig. 3 looking in the direction of the arrow; Fig. 6, an enlarged sectional elevation of the power-generating cylinders, taken on line 6 of Fig. 2 looking in the direction of the arrow; Fig. 7, a detail elevation of the motive-fluid-supply pipes and compound valves which control the admission and exhaust of motive fluid to and from the cylinders and piston mechanisms that operate the movable compressing-platen; Fig. 8, an enlarged cross-sectional elevation of one of the four-way valves shown in Fig. 7; Fig. 9, an enlarged sectional detail of one of the compound valves, taken on line 9 of Fig. 7 looking in the direction of the arrow; and Fig. 10, a continuation of the mechanism shown in Fig. 9, illustrating an enlarged sectional detail of a second compound valve and taken on line 10 of Fig. 7 looking in the direction of the arrow.

In constructing and operating a cotton-press in accordance with these improvements it is desirable that the mechanism which actually contacts the cotton to compress the same should be operated at first by a light or initial pressure and finally by a comparatively heavy pressure, so that the parts will be moved easily at first, when there is the least resistance, and by a light pressure until they can practically move no farther, and finally bringing into play the total or greatest pressure, so as to compress the cotton to its greatest extent without in any way changing the maximum pressure of the motive fluid, all of which will more fully hereinafter appear.

Describing first the mechanism by which the cotton is compressed, I provide a base portion $a$, which may rest upon a solid concrete or similar foundation $b$. Supported on this base portion by means of a plurality of pillars $c$ is an upper fixed wall or platen $d$, which, as shown particularly in Fig. 1, is secured to the upper end of the supporting-pillars.

To compress the cotton in the manner desired, a movable compressing-platen $e$ is provided and arranged to be moved upwardly and downwardly between and on the supporting-pillars, which act as guides therefor. It is well known that the different parts of the cotton-bale at first offer different degrees of resistance to the compressing mechanism, and consequently that it is desirable to have such mechanism constructed to accommodate these different degrees of resistance. In order to accomplish these results, the compressing-platen above described is provided with a pair of parallel concave edges $f$, fitted with convex guiding ends $g$, which really form a part of the platen, or, in other words, a swivel-joint therefor. These convex guiding ends are kept in engagement with the main body of the platen by means of bolts and washers $h$. (Shown particularly in Fig. 4.) By this construction it will be seen that this platen is made in three parts—a main body portion and a pair of parallel swivel guiding end portions—which permit it to have a certain amount of flexibility to accommodate or compensate for the different degrees of resistance offered by the cotton-bale during its compression.

To move the platen upwardly and downwardly, first by means of a low or inital pressure and finally under maximum pressure, I provide a plurality of cylinder and piston mechanisms formed in two sets, which divide the total exposed or active surfaces of such cylinder and piston mechanisms into two sets of unequal area—the set of smaller superficial area, through which the light or initial pressure is applied, and the second or larger area, which is finally brought into use when it is desired to develop a heavy maximum force or pressure and apply it to the entire area of the cylinder and piston mechanisms without altering the pressure of the motive fluid. To accomplish this result, I prefer to provide what I term a pair of "movable" cylindrical piston mechanisms $i$ and $j$, which are made in the form of shells, as it were, the upper ends abutting or resting against the under surface of the movable compressing-platen, as shown particularly in Fig. 3. These cylindrical pistons are movably mounted in annular pressure-chambers $k$ and $l$ in the base of the machine, and, as above suggested, in turn provide interior cylindrical chambers $m$ and $n$. These cylinder-pistons are further and movably mounted upon fixed central projections $o$ and $p$ in the annular pressure-chambers, upon which they move up and down and which are preferably formed integral with the base portion.

An inspection of Figs. 3 and 5 in connection with the foregoing description will show that the exposed or active surfaces of the fixed central projections when compared with the exposed or active surfaces of the movable cylindrical pistons have a smaller superficial area. In other words, the construction and arrangement of the cylinder and piston mechanisms is such that they form two sets of piston mechanisms of unequal areas of exposed or active surfaces. When motive fluid is furnished to the set of fixed central projections of small superficial area, a light pressure or force is developed to operate the movable platen at first. When the motive fluid is applied to both sets or the total area of the piston mechanisms, a heavy pressure and force are developed to operate and compress the bale into its smallest space.

The motive fluid is furnished to and exhausted from the small set of cylinders and pistons by means of a pipe $q$, while the motive fluid is furnished to the larger set of pistons through a pipe 22 and passage-way $r$, where it enters the cylindrical chamber $l$ at first, thence passes through ports or passages $t$ to the chamber $k$.

As above suggested, it is highly desirable that motive fluid at a substantially constant pressure be furnished to the set of cylinder mechanism of small area to develop a light pressure or force at first, so as to move such piston mechanisms, and thereby the movable compressing-platen, in a manner that will minimize the danger of destruction of the parts of the machine. To accomplish this, a compound valve is provided comprising a casing $u$, in which is seated a main or large valve $v$, as shown particularly in Fig. 9. This valve-casing has an open by-pass 100, extending around the main valve, so that the motive fluid, which is preferably water or other liquid under heavy pressure, may pass from a passage or pipe $x$ around and into a pipe or passage $y$, which connects with the branch pipe $q$, entering longitudinal passages $z$ in the small pistons and passing therethrough into the cylinders $m$ and $n$, above described. The main valve $v$ has a plurality of small passages $w$, through which the water, which may be at four thousand pounds pressure to the square inch, is obliged to pass slowly into such main valve. It will be understood that the by-pass 100 is always open, so that when the main supply-pump, hereinafter described, is operated the motive fluid can always enter the pistons of small area. It is desirable, however, to have means at hand by which the operator or engineer may move this compound valve in the desired manner. To accomplish this result, the compound valve above described is provided with a smaller valve 20, axially mounted and seated therein, so as to open and close an opening 21 in the end thereof. This valve when opening the passage 21 permits a small quantity of the motive fluid which enters through the passage 100 to enter a pipe or passage 22, from whence it flows down, as shown in Figs. 9 and 10, into the passage $r$ and by the means above described into the cylindrical chambers $l$ and $k$, thereby furnishing motive fluid at the same pressure to the larger or remaining set of cylinder and piston mechanisms. To operate and open this supplementary or second valve 20 of the compound valve, it is provided with a stem portion 23, which has on its opposite end a piston 24, mounted thereon and operating in a cylinder 25. This cylinder has two pipes 26 and 27 connected therewith, which form, through the medium of a four-way valve 28, inlet and exhaust pipes, as occasion may require. When the handle 29 of the four-way valve is turned to the right, motive fluid will pass through the passage 41 in such valve into the pipe 26 and into the cylinder 25 to the left of the piston, as shown in Fig. 9, thereby moving the piston and small valve outward and opening the passage 21 in the main valve, as above described. The motive fluid supplied to the cylinder 25 is only sufficient to operate the small valve 20 and not to move the large valve $v$. When, however, the pressure to each side of the main valve is balanced, any excess pressure at the left side of piston 24 in the cylinder 25 will move the small valve 20 to the right, and the contacting of shoulder 101 with bushing 102 will move the large valve in the same direction, thereby permitting the motive fluid to pass freely from the pipe or passage $x$ to and through the pipe or passage 22 and supply the total areas of cylinders and pistons with motive fluid to develop a maximum pressure or force. In other words, it will be seen that when no pressure is in existence to the left of the main valve *v* (shown in Fig. 9) such valve is not balanced and the piston 24 has not sufficient force to operate it; but when the pressure on each side is balanced then any extra pressure on the left side of the piston is sufficient to operate it.

From the foregoing description of construction and operation it will be seen that before all of the valve mechanisms are put into use the motive fluid passes into the cylinder-chambers *m* and *n* and the movable platen is operated by a light or initial pressure. It is desirable, however, that some fluid or other at atmospheric pressure be furnished the chambers *k* and *l*. To provide for this result, a reservoir or tank 128 is provided and connected with the pipe 22, above described, by means of a second compound valve 29 and pipe 30. This second compound valve is formed of a main valve 31, having an auxiliary passage 32 therethrough, which is opened and closed by means of a second smaller valve 33. This smaller valve is operated by means of a piston 34 upon the stem thereof, which operates in a cylinder 35, said cylinder being provided with supply and exhaust pipes 36 and 37, which are regulated and controlled by means of a second four-way valve 38 in all respects similar to the structure shown in Fig. 8. The operator first turns the four-way-valve handle 39 to the right, as shown in Fig. 7, which connects the passage 41 therein with the pipe 36 and furnishes a supply of motive fluid to the outer end of the cylinder 35, thereby moving its piston and the supplementary or second valve 33 inwardly and permitting the water under its normal dynamic head to enter the passage *r* and therethrough into the cylinders of larger area. As there is no substantial pressure on the right of the main valve 31, the piston 34 will continue to move inwardly until the main valve opens and the water can freely enter the passage *r*. When the pistons of smaller area can no longer be worked by pressure therein, before the small valve 20 is operated by means of its movable piston the operator moves the handle 39 of the second four-way valve to the left, thereby closing such pipe against a further inlet of motive fluid and continuing its movement until the passage 40 connects pipes 36 and 42. When in this condition, the steam or other motive fluid in the cylinder 35 is permitted to exhaust through the pipe 42. A continued movement of the valve-lever 39 to the left brings the passage 41 into such condition that it connects the supply-pipe 143 with the pipe 37, so that the motive fluid may enter the cylinder 35 to the right of the piston 34, and thereby move such piston to the left, close the small valve 33, and move the main valve 31 with it against its seat in the valve-casing 29. The parts are then in position to permit a final pressure to pass through the passages 22 and *r*.

When cotton has been compressed the desired amount, it is desirable to exhaust the motive fluid, so that the gravity of the parts may act to restore them to their normal condition. If the motive fluid were suddenly freed or exhausted, the weight of the movable parts, which weigh all the way from twenty to sixty tons, would drop back suddenly and be apt to destroy some of the mechanisms. In order to prevent this, the second compound valves 31 and 33, above described, are provided to control the exhaust operations, which are as follows: The first compound valve is closed by means of the four-way valve 28, the lever of which is thrown or operated to the left, which furnishes motive fluid to move the piston 24 to the left, as shown in Fig. 9. The main pump or generator is also stopped. The lever 39 of the second four-way valve is operated to the right, so as to bring the passage 41 into line with the inlet-pipe 143 and the supply-pipe 36. This action opens a passage and furnishes fluid to operate the piston 34 inwardly, and thereby move the small valve 33 also inwardly, opening the auxiliary passage 32 through the main valve. This permits the exhaust of motive fluid to the reservoir or tank to take place in a slow manner, so that the parts are forced to assume their normal position in a slow and even manner, thereby minimizing the danger of destruction. The four-way valves 28 and 38 are constructed in a similar manner, both having passages 40 and 41, the passage 41 being to supply steam under pressure and the passage 40 to contact with the pipe 42 and permit the exhaust of steam to take place, all of which will be understood by those skilled in the art.

To supply a liquid under the desired pressure—say about four thousand pounds to the square inch—I provide a steam-cylinder 43, having a movable piston 44 mounted therein, the piston-rod 45 of which forms a ram or plunger and operates in a liquid or what I prefer to term a "power-generating" cylinder 46. This power-generating cylinder by means of the pipe 47 connects with the first-named combination valve. (Shown in Fig. 9.) It is well known that water is practically incompressible, so that when the main piston 44, which is being operated upon by steam supplied through the pipe 48, moves to the left the water is put under desired pressure. To move the piston 44, with its ram or plunger 45, backward, steam is admitted to the left of the cylinder through a second pipe 48, as shown in Fig. 2. Each end of the cylinder is provided with pairs of exhaust and supply pipes 48 and 49, arranged diagonally with regard to each other. In other words, the supply-pipes 48 are on one side of the longitudinal axis of the cylinder and the exhaust-pipes 49 on the other side. The supply-pipes 48 are connected with a source of steam-supply by means of a pipe 50 and the exhaust-pipe with an exhaust and heating drum 51. Each of these pipes at the bends thereof is provided with ordinary rotatable valves, (not shown in detail,) which are operated by means of the valve-stems 52 and levers 53, joined together in pairs and connected by means of links 54 and an operating-lever 55, so that the operator may stand upon a platform 56 and reach the operating-lever 55 and rotate the valve-rods 52 the desired amount.

In order that no negligence of the operator or engineer may cause any damage to the main-cylinder piston, such cylinder is provided with tripping-pins 56 at each end, engaging with pivoted levers 57, in turn pivotally connected with the links 54, so that as the piston moves in either direction and approaches either limit of its movements, as shown in Fig. 6, such movements if continued will operate such tripping-pins, levers, links, and valves to close the inlets and open the exhaust, thereby stopping the parts and preventing any injury thereto.

In operation and referring particularly to Fig. 7, the inlet-pipe 143 is connected with a source of constant motive fluid under practically uniform pressure, preferably water. A bale of cotton is placed between the stationary and movable platens and steam admitted to steam-cylinder 43, Fig. 6, through the valve 48. The effect of this is to force piston 44, with its plunger or ram, forward in cylinder 46 and generate a hydraulic pressure. This pressure is transmitted through pipes 47 and $y$ and connections $q$ to the cylindrical pressure-chambers $m$ and $n$ of the compressing mechanism.

Referring to Fig. 9, it must be understood that passages $x$ and $y$ are always connected and always under the same pressure. When the movable platen has been raised against the bale and until its resistance overcomes the pressure of steam in cylinder 43, so that its piston 44 has come to rest, the compound valve 31, which closes the passage from the tank 128 to passage $r$, should be closed, confining the water in the cylinders $k$ and $l$, which has flowed in from the tank, following the pistons as they were raised by the initial pressure. When such valve 31 is closed, the motive fluid should be applied to the left of piston 24 and valve 20 opened, allowing water to flow through the small openings $w$ to the passages 21 and to the pipe 22, which connects with passage $r$ and cylinders $k$ and $l$. It will be understood that at this time the steam-piston 44 has traveled a considerable portion of the length of the cylinder 43 and that the live steam under high pressure is confined between piston 44 and cylinder-head to the right, and it will also be understood that if a free opening were established between pipe 47 and passages $x$ and 22 the expansion of steam in the cylinder 43 would force the piston 44 forward at a dangerous velocity. This is overcome by making the combined area of the openings $w$ such that the friction of the water flowing through these openings will retard the movement of piston 44 to a safe speed or extent. The opening 21 is of much greater area than the combined area of the openings $w$ and prevents water flowing through 21 from cutting and defacing the seat of the valve 20. The pressure supplied to the pipe 143 is such that when applied to the area of the valve-piston 24 it will move the valve 20, whose unbalanced area is not sufficient to open the valve $v$ when the head contacts same. However, as the water passes through the openings $w$ and 21 and the movable platen is forced upward the pressure will gradually equalize between the pipes $x$ and 22, leaving no unbalanced pressure on valve $v$. When this point has been approximated, the pressure against the left-hand side of piston 24 will be sufficient to open the valve $v$ to its fullest extent, and the water will flow from $x$ to 22 and inward to $r$ and into the remaining pistons, developing the maximum pressure or force for the final compression of the bale.

When the bale has been securely fastened, the press is lowered by exhausting the steam at the right of piston 44 and turning live steam through the valve 48 at the left of the piston into cylinder 43, forcing the piston 44 back to its original position. As soon as the piston 44 has started back the pressure in all the pipes 47, $x$, $y$, 22, and $r$ and in the cylinders $k$, $l$, $m$, and $n$ will be reduced to that caused by the gravity of the moving parts of the press. It will be understood now that there is confined within the chambers and pipes above specified an excess of water, more than can be circulated by one movement of the ram or plunger 45. Consequently the press cannot be returned to its original lower position without opening the valve 31 or 33. If the valve 31 were opened to its fullest extent, the gravity of the press would be so great that the moving parts would drop back at such a speed as would be likely to destroy or injure some portion of the press. Again, if the valve 31 were opened only sufficient to allow the moving parts of the press to settle slowly the opening between 31 and its seat would be so small that the valve would vibrate and make a disagreeable noise. To overcome this, the auxiliary valve 33 is supplied. This being much smaller than the valve 31 can be opened, so that the space between the valve and its seat will be such that the vibration of the valve never would bring the seat and valve in contact. The area of the piston 34 is such that the pressure supplied through the pipe 143 will not open the valve 33 while under any pressure in excess of the gravity of the parts of the press and will not open 31 even with the pressure due to the gravity of the press. The action of the valve is as follows:

In opening valve 31 pressure must be supplied to pipe 36 through valve 38, operating piston 34, which in turn opens valve 33, allowing the excess in cylinders $k$, $l$, $m$, and $n$ to flow to the tank. When the movable compressing-platen has reached its lowest point, the valves $v$ and 20 will be closed by turning pressure into cylinder 25 through pipe 27 by movement of the valve 28, confining the motive fluid in cylinders $m$ and $n$ and pipes $q$, $y$, $x$, and 47 and the motive-fluid-generating cylinder 46, thereby supporting the moving parts of the press. It will be seen that as soon as the gravity of the press is supported by the water in cylinders $m$ and $n$ there can be no pressure remaining upon the valve 31, and the pressure already turned into cylinder 35 through the pipe 36 will move piston 34 to the right and open valve 31 to its fullest extent, making a free connection between passage $r$ and the tank. The stem of the valve 33 carries a sleeve $33^a$, the end of which constitutes an abutment arranged to engage the end of the stem of the valve 31 to open said valve 31 in an obvious manner when the stem of said valve 33 is shifted to the right, Fig. 10.

The order of the operation is as follows: The valves 28 and 38 should be in such position as will close valves $v$ and 20 and open valves 31 and 33. Then by moving lever 55 to the left steam is turned onto the steam-cylinder, and when baling-press comes to rest by the resistance of the bale valves 33 and 31 should be closed. By moving lever 29 valve 20 is opened, and when pressure has been equalized in pipes 47, $x$, and 22 valve $v$ is opened. When bale has been pressed, a movement of lever 55 to the right causes the steam to be exhausted, and piston 44 returns to its original position. By moving lever 39 valve 33 is opened, and when the movable platen has reached its lowest position a movement of valve-lever 29 causes valves $v$ and 20 to be closed, when valve 31 will open and the press be ready for another operation.

When I make use of the expression that the pistons or piston mechanisms are so related to the platen as to permit flexing of the latter, it is with the intention of conveying the idea that the apparatus is devoid of any connecting instrumentalities between said pistons and platen as would interfere with the yielding of portions of the platen, which is flexible, as stated, to compensate for the inequalities of pressure and resistance.

I claim—

1. In mechanisms of the class described, the combination of a flexible supporting-platen arranged to compensate for inequalities of pressure and resistance, a plurality of operating piston mechanisms for operating the same, means for supplying motive fluid to a portion of the piston mechanisms to develop an initial pressure, and means for supplying motive fluid to all of the pistons to develop a maximum pressure for operating the parts, said piston mechanisms being so related to the platen as to permit flexing of the latter, substantially as described.

2. In mechanisms of the class described, the combination of a fixed platen, a flexible platen arranged to compensate for inequalities of pressure and resistance, a plurality of piston mechanisms for operating the same divided into two sets of unequal areas, means for supplying motive fluid to the set of pistons of small area to develop an initial or light pressure, and means for supplying motive fluid to the total area of pistons to develop a maximum pressure to operate the parts, said piston mechanisms being so related to the platen as to permit flexing of the latter, substantially as described.

3. In mechanisms of the class described, the combination of an upper fixed wall, a flexible platen, two sets of cylinder and piston mechanisms of unequal area for operating such platen composed of a plurality of movable piston-cylinders contacting the lower side of the platen forming pistons of the larger area, relatively fixed pistons therein of smaller superficial area, said cylinder and piston mechanisms being disconnected from the platen whereby flexing of said platen is permitted, and means for supplying motive fluid first to the set of cylinders and pistons of smaller area and finally to the remaining area of cylinders and pistons, substantially as described.

4. In mechanisms of the character described, the combination of a flexible platen arranged to compensate for inequalities of pressure and resistance, piston mechanism for operating the same, and means for supplying motive fluid to said mechanism, said piston mechanism being so related to the platen as to permit flexing of the latter.

5. In mechanisms of the character described, the combination of a flexible platen arranged to compensate for inequalities of pressure and resistance, a piston mechanism for operating the same, means for supplying motive fluid to a portion of the piston mechanism to develop an initial pressure, and means for supplying motive fluid to the whole of said piston mechanism to develop a maximum pressure for operating the parts, said piston mechanism being so related to the platen as to permit flexing of the latter.

6. In mechanisms of the character described, the combination of a flexible platen arranged to compensate for inequalities of pressure and resistance, and means for operating said platen, said means being so related to the platen as to permit flexing of the latter.

7. In mechanisms of the character described, the combination of a flexible platen arranged to compensate for inequalities of pressure and resistance, and fluid-pressure means for operating said platen, said means being so related to the platen as to permit flexing of the latter.

8. In mechanisms of the character described, the combination of a flexible platen composed of swiveled members arranged to compensate for inequalities of pressure and resistance, and means for operating said platen, said means being so related to the platen as to permit flexing of the latter.

9. In mechanisms of the character described, the combination of a flexible platen composed of swiveled members arranged to compensate for inequalities of pressure and resistance, and fluid-pressure means for operating said platen, said means being so related to the platen as to permit flexing of the latter.

ELMER E. HANNA.

Witnesses:
HARRY I. CROMER,
ANNIE C. COURTENAY